United States Patent [19]

Simpson et al.

[11] Patent Number: 6,111,013
[45] Date of Patent: Aug. 29, 2000

[54] POLYMER PRODUCT MANUFACTURE

[75] Inventors: Brian Robert Simpson; Robert Ashley Mein, both of Fife, United Kingdom; Richard Michael Kopchik, Southhampton, Pa.

[73] Assignee: Forbo International S.A., Switzerland

[21] Appl. No.: 09/011,368

[22] PCT Filed: Jul. 11, 1996

[86] PCT No.: PCT/GB96/01680

§ 371 Date: Feb. 4, 1998

§ 102(e) Date: Feb. 4, 1998

[87] PCT Pub. No.: WO97/06209

PCT Pub. Date: Feb. 20, 1997

[30] Foreign Application Priority Data

Aug. 4, 1995 [GB] United Kingdom .................. 9516057
Feb. 5, 1996 [GB] United Kingdom .................. 9602217

[51] Int. Cl.[7] ............................. C08L 51/06; C08L 33/02; C08F 279/02
[52] U.S. Cl. ............................. 525/64; 525/69; 525/222; 525/227; 525/309
[58] Field of Search ............................. 525/313, 193, 525/305, 309

[56] References Cited

U.S. PATENT DOCUMENTS 4,115,479  9/1978  Daidone .................................. 525/193
4,496,692  1/1985  Riew et al. ............................. 525/112

FOREIGN PATENT DOCUMENTS 211 069   3/1989  Hungary .
9202896   of 1991 Hungary .

*Primary Examiner*—James J. Seidleck
*Assistant Examiner*—Olga Asinovsky
*Attorney, Agent, or Firm*—Gifford, Krass, Groh, Sprinkle, Anderson & Citkowski, P.C.

[57] ABSTRACT

The present invention relates to a process for the manufacture of a plastics product from a polyolefin resin using a plasticizer monomer system which is substantially non-polymerizable under the product shape forming, conditions used in the product manufacturing process and which acts as a plasticizer or processing aid under said shape forming conditions, while being substantially polymerizable subsequently so as to produce a product substantially free of liquid plasticizer. The plasticizer monomer is mixed with the polyolefin resin; and the mixture formed into a desired product form. Polymerization of the plasticizer monomer then provides a final product substantially free of liquid plasticizer.

35 Claims, No Drawings

POLYMER PRODUCT MANUFACTURE

The present invention relates to the manufacture of polymer products.

Many plastics products are manufactured by forming a feed stock of polymer material into a desired shape or configuration using well known processes such as for example, extrusion, spread sheet formation or hot roll calendering in the case of plastics sheet manufacture. Especially in the case of spread sheet formation, this requires the polymer material to be substantially fluid. At the same time though it is often necessary to limit the temperature of the polymer material in order to avoid degradation thereof or impairment of its physical properties.

In the case of polyvinyl chloride (PVC) and like polymers there is more or less widely used the so-called vinyl plastisol technology in which small particles of PVC powder are suspended in a liquid carrier in order to reduce the viscosity thereof to a sufficient level to allow the physical manipulation thereof whether by spread coating or hot roll calendering or a similar process, to proceed under practical conditions, and upon subsequent heating of the mixture the PVC polymer resin melts into an amorphous mass into which the liquid carrier is absorbed. This technology is however peculiar to vinyl polymers and cannot be extended to other polymers.

In practice though significant environmental problems can arise caused by the migration of liquid plasticizers out of the material. The final product may also suffer loss of performance due to the presence of residual liquid plasticiser and/or due to leaching thereof from the product over an extended period of time in use thereof.

In the case of polyolefins it has been previously proposed to include small amounts of oils and the like to fine tune their processability. It has also been proposed to manufacture polyolefin products containing more or less large amounts of oils in order to modify processability and produce particular product characteristics such as softness. The utility of such products is howevever substantially restricted since they contain relatively large amounts of liquid. It has not previously been possible, though, significantly to extend the processability of polyolefins without substantially compromising the physical properties of the final product.

It is an object of the present invention to avoid or minimize one or more of the above disadvantages.

It has now been found that the processability of polyolefins in the manufacture of products from polyolefins and the versatility and range of products based on polyolefins can be substantially improved and extended by inclusion of a plasticiser or processing aid comprising a selectively polymerisable liquid monomer system which is substantially non-polymerisable under the product forming, e.g. extrusion, spread-coating or calendering, conditions used in the product (e.g. sheet material) manufacturing process whilst being substantially polymerisable subsequently so as to produce a product substantially free of liquid plasticiser. In this connection it will be understood that there is normally used an initiator substance in order to induce polymerisation of the monomer and which is included together with the monomer in the monomer system. Accordingly in such cases it is important that the initiator is one that is selectively activatable i.e. is substantially inactive under the polyolefin product forming conditions but may subsequently be activated under suitable plasticiser monomer polymerisation or curing conditions.

Thus in one aspect the present invention provides a process for the manufacture of a plastics product from a polyolefin resin comprising the steps of: providing a plasticiser monomer system which is substantially non-polymerisable under the product shape (e.g. sheet) forming, e.g. extrusion, spread-coating or calendering, conditions used in the product (e.g. sheet material) manufacturing process and which acts as a plasticiser or processing aid under said shape forming conditions, whilst being substantially polymerisable subsequently so as to produce a product substantially free of liquid plasticiser; bringing at least the plasticiser monomer of said plasticiser monomer system into intimate admixture with said polyolefin resin (and any additives that may be used therewith); forming said mixture into a desired product form; and subsequently inducing polymerisation of said plasticiser monomer so as to provide a final product substantially free of liquid plasticiser.

The invention also extends to plastics products when manufactured by the process of the present invention.

For the avoidance of doubt it should be noted that the expression "plasticiser monomer" encompasses a wide range of monomers which can enhance in some way the flowability of the polyolefin under at least some conditions, including monomers which are themselves liquid at ambient temperature, monomers which produce a generally liquid mixture when intimately admixed with the polyolefin used at ambient temperature, and monomers which when intimately admixed with the polyolefin used are substantially solid at ambient temperature but enable formation of a substantially homogenous and flowable mixture at elevated temperatures below the polymerisation temperature and in particular under the product shape forming conditions. The expression "plasticiser monomer system" is used herein to indicate the plasticiser monomer together with any initiator and/or other suitable material that may be used in the polymerisation of the plasticiser monomer, and which may be included together with the plasticiser monomer at all stages in the process of the invention or only at (a) later stage(s) thereof.

With the process of the invention the processability of the polyolefin in the manufacture of various product forms from the polyolefin is substantially improved thereby extending the range of possible products which can be made from the polyolefins, and allowing significant economic benefits e.g. in relation to increasing use of equipment previously only usable for other polymer systems, reduced energy requirements, less demanding product forming conditions etc. Also design flexibility in relation to the particular form of the polyolefin in the final product may be significantly enhanced.

Thus the present invention provides advantages in both processing and in the properties of the resulting materials, and opens up polyolefins to a range of processing options that are similar to those used in the vinyl plastisol area and from which polyolefins were previously excluded. The incorporation of different amounts of different types of monomers with a wide range of crosslinking densities can moreover provide a broad range of physical and chemical properties in the final product. Combined with the ability of this system to contain large amounts of fillers and other additives, materials can be prepared that range from soft elastomers to tough plastics, from clear to opaque, from coatings on fabrics to structural materials. The versatility of olefin based systems is thus greatly enhanced and extended.

One example of this idea is the formation of a multi-layer floor covering from metallocene polyolefins and a "liquid paraffin like" monomer system using spread coating technology. Such a material is disclosed in our copending International patent application PCT/GB95/01855 dated Aug. 4, 1995.

The range of polyolefins that can be used in accordance with the present invention include: polyolefin polymers, copolymers, and terpolymers prepared by any known polymerization technique—such as free radical, Ziegler-Natta, single-site catalysed (metallocene) etc. Moreover with such polymers all of the possible polymer geometries can be utilized—such as straight chain, branched, stereo regular, etc. The hydrocarbon polymer chains may also be substituted in known manner e.g. by incorporation of functional monomers or by post-polymerization functionalization. Copolymers of olefins and acidic monomers (such as Surlyn from Dupont) or polar monomers (such as Enathene, an ethylene/butyl acrylate copolmer from Quantum Chemical) would be examples of such materials. Polymers prepared by extruder reaction grafting of monomers, such as maleic anhydride, to non-functional polyolefins would also be examples of this. It will also be understood that the polyolefin resin may comprise two or more different polyolefins.

Whilst various polyolefins may be used in the process of the present invention, this is particularly advantageous when used with single-site catalysed (metallocene) polyolefins as the polymer chains of these have terminal double bonds and thus can react with the polymerising monomer thereby providing a degree of chemical inter-bonding between the polyolefin and the polymerised monomer. This can be beneficial in improving the physical strength of the product material with better resistance to stretching and to impact shock waves with these tending to be absorbed by deformation rather than delamination.

A variety of polymeric and non polymeric additives can be incorporated into these polyolefin systems. This includes the full range of inorganic fillers and reinforcements, fire retardants, stabilizers, dyes and pigments, and the like. The polymeric additives would include impact modifiers, processing aids, compatibilizers, blending aids, as well as polymeric stabilizers, flame retardants, pigments, and texturing aids. Gas inclusions, in the form of either open or close cell foam can also be part of the polyolefin system. This can be achieved both through the use of a chemical blowing agent or through the mechanical incorporation of air, or another gas, into the system.

It is also possible by means of the present invention to produce microporous polyolefin products by using monomer systems which can be extracted to a greater or lesser extent, conveniently by means of solvents, from the product after polymerisation of the monomer. In this case the monomer system is chosen so as to be substantially monofunctional whereby cross-linking of the monomer and/or with the polyolefin is substantially avoided, preferably yielding not more than 0.1% cross-linking. Various pore sizes can be achieved in this way, generally from 20 to 3000 nm, for example, from 100 to 1000 nm, in diameter. In general smaller pore sizes are obtained by using monomers with greater compatibility with the polyolefin and larger ones by using monomers with less compatibility with the polyolefin. As used herein "compatibility" indicates inter alia the strength of interfacial adhesion between the two components after phase separation upon cooling of the product.

Where it is desired to impart fire-retardant properties to the product, this may also conveniently be effected by using a suitable monomer. More particularly there may be used a monomer substituted with bromine e.g. dibromo or tribromo styrene or tetrabromo bisphenol A diacrylate.

It will be appreciated that the degree of fire resistance imparted may be varied according to the nature and amount of the monomer used. Conveniently there may be used from 1 to 75% w/w of fire retardant enhancing monomer in the monomer system or from 0.2 to 60% w/v relative to the polyolefin and monomer.

It will be understood by those skilled in the art that polyolefins are normally thermoplastic in nature. By use of suitable monomer systems in the processes of the present invention, i.e. monomer systems which yield more or less significant amounts of cross-linking, it is possible to produce substantially polyolefin based products which are of a substantially thermosetting nature.

The plasticiser monomers that can be used in accordance with the present invention are generally those that are solvents for the main polymer component(s) of the polyolefin product. They need not, and would normally not, be solvents for the inorganic components nor for other components, which may themselves also be polymers, such as impact modifiers, texturing aids, pigments, and some compatibilizers. The monomers will, in general, have a long segment that is "polyolefin like" with a group that is capable of free radical polymerization. Advantageously there are used monomers wherein the polymerisable group is located at one end of the chain as such monomers are usually considerably more reactive than those where the group is located internally. Preferably there are used monomers which have a molecular weight in the range from 200 to 5,000, for example, from 300 to 3,000. Suitable "polyolefin like" structures are typically hydrocarbons with ten or more carbon atoms, and examples of such groups would be lauryl ($C_{12}H_{25}$) and stearyl ($C_{18}H_{37}$). Such structures can be linear, branched, or cyclic; depending in part upon the structure of the polyolefin. The polymerizable group can be a simple unsubstituted double bond, such as in 1-dodecene or a more complex unit such as a methacrylate, as in stearyl methacrylate. Other polymerizable groups that may be mentioned include esters of vinyl alcohols e.g. vinyl stearate, and substituted styrene groups such a p-isobornyl styrene.

When polyfunctional monomers are included in the system then a continuous crosslinked polymer system can be formed from the monomer. Optionally additional radical generators can be included that will provide cross linking of the pre existing polyolefin system. A Semi-IPN (interpenetrating network) is obtained when one of the co-continuous systems (i.e. the pre-existing polyolefin and the polymerised plasticiser monomer) is crosslinked. When both systems are crosslinked an IPN is formed.

It is a particular advantage of the invention that a wide variety of physical properties, many previously unattainable in polyolefin systems, can now be imparted to polyolefins by the use of suitable monomer systems in suitable amounts in accordance with the present invention. Further flexibility is available moreover by means of using mixtures of two or more different monomers.

In general there may be used as little as 20%, preferably from 30% to 70%, most preferably from 40 to 60%, w/w of monomer in the polyolefin—monomer mixture (exluding other additives such as fillers etc.) depending on inter alia the solubilizing properties of the monomer system. In this connection it may also be noted that where it is desired to use a monomer for the purpose of imparting particular properties e.g. fire resistance, but that monomer has relatively poor solubilizing properties at the required temperature, then the necessary solubilizing character of the monomer system may be obtained by including a second monomer which does have good solubilizing properties e.g. the use of lauryl methacrylate to incorporate tribromostyrene.

It is also generally desirable to use monomers which for safety reasons have a reasonably high boiling point, and a reasonably high flash point: preferably at least 125° C., most preferably at least 160° C.

A further factor affecting choice of monomer is the relative reactivity of the polymerizable functional group in the monomer. Thus where relatively fast polymerization is desirable particularly suitable monomers include stearyl acrylate and where slower polymerization is acceptable or more suitable there may be used monomers such as 1-dodecane.

By means of suitable choice of the monomer system it is possible to control the morphology and hence the properties of the product material in various ways. On the one hand it is possible to vary the size and shape of polyolefin and polymerized monomer domains, and on the other hand it is also possible to control the nature of the polymerized monomer domains.

Thus for example where the polyolefin and the polymerized monomer have signficantly different refractive indices the resulting material would normally tend to be opaque. Where however the domain sizes of the two components are less than around 200 nm there is obtained a relatively clear product material, and if the domain size is around 100 nm or less then the product material becomes substantially transparent. Such domain sizes may be obtained by using, for example, lauryl methacrylate in Exact 4038 polyolefin from Exxon.

More generally, the domain size of the polyolefin and polymerised plasticiser monomer may be controlled by the compatibility of the monomer with the polyolefin. This in turn depends on how close various properties of the plasticiser monomer, such as cohesive energy density, polarisability and polarity, are to those of the polyolefin. In addition the amount of plasticiser monomer relative to polyolefin, and the amount of copolymer formed by incorporation of metallocene polyolefin terminal double bond into the polymerised plasticiser monomer can also affect domain size. Where the materials are more or less highly incompatible then the domain may be determined largely by the size of polyolefin "particles" in the mixture and may be several hundred microns. Where there is high compatibility the domain size may be substantially less than 1 micron.

The shape of the polymerized monomer domains can also be controlled e.g. to form substantially spherical domains in order to provide enhanced impact resistance while retaining the thermoplastic nature of the system in a product where the polymerized monomer has a substantially thermoset character but there is little or no crosslinking with the polyolefin so that the thermoplastic character of the latter is substantially retained. This may be achieved by means of proper adjustment of the compatibility and interfacial adhesion of the two phases relative to each other. Further information on polymer compatibility is readily available from standard publications such as the chapter on "Control Phase Structure in Polymer Blends" by Dr. Don R. Paul in "Functional Polymers" By D. E. Bergbreister & C. R. Martin published by Plenum Press ISBN 0-306-43203-x.

The product material properties can also be significantly modified by means of using monomers which yield polymers with suitable characteristics. Thus for example where it is desired to increase tensile strength and/or modular stiffness, then monomers such as isobornyl methacrylate which yield high Tg (glass transition temperature) e.g. up to 160° C., generally up to 125° C., polymers are desirably included. Where it is desired to increase impact strength then monomers yielding low Tg polymers, e.g. down to −80° C., generally down to −70° C., such as lauryl acrylate, are preferred. It will of course be appreciated that the Tg for a polymer from a particular monomer can also be varied to some extent by means of addition of a comonomer. In this way it is also possible beneficially to substitute, to a greater or lesser extent, other components such as inorganic fillers which may have been included in order to improve hardness but are prejudicial to other physical properties such as transparency, or fire retardant additives which tend to make the product material undesirably brittle.

It will also be understood that by using polyfunctional monomers i.e. monomers with more than one polymerizable group, significant degrees of cross-linking may be obtained which can have beneficial effects in improving tensile strength and % elongation at break. Conveniently the monomer system contains from 2 to 20% w/w of polyfunctional monomer, advantageously from 5 to 15% w/v.

In order to cure or polymerise the plasticiser monomer or monomers, there is generally used in the plasticiser monomer system, an initiator or catalyst compound that generates free radicals at elevated temperatures substantially, e.g. at least 20° C., preferably at least 40° C., most preferably at least 50° C., above those of the product shape forming conditions or when exposed to a suitable radiation. In the latter case it will be appreciated that polymerisation of the plasticiser monomer may not need any elevation of temperature above that of the product shape forming conditions. Optionally also crosslinking monomers may be included in the plasticiser monomer system to facilitate curing thereof and to provide enhanced properties.

Many classes of free radical generators can be used, but materials in the peroxide, ketone peroxide, peroxydicarbonate, peroxyester, hydroperoxide, and peroxyketal families are of particular use. Also of utility are several classes of azo compounds and a variety of photo-initiators. Where the initiators are present during the product shape forming phase then it will be understood that the characteristics needed in these compounds are that they remain essentially dormant during the initial mixing, compounding, and product fabrication process but can be induced to produce free radicals at a rate that will initiate a polymerization of the monomer e.g. when the temperature is increased, or when exposed to the appropriate radiation. For example a material such as t-butyl perbenzoate has a half life of over 1000 hours at 100° C., while having a half life of less than 2 minutes at 160° C.

In a polymer/monomer system containing such an initiator it would be possible to process the system into the finished product form (i.e. shape or configuration) at 100° C. and then cure the system by a brief exposure at 160° C.

It is also possible to use more sophisticated initiator systems in order to control the polymerisation process. Thus for example by grafting maleic anhydride or some other suitable moiety which is itself capable of generating free radicals or can be converted into a free radical generating moiety, onto the polyolefin polymer chain, polymerisation will start selectively on the polyolefin chain at the graft. This results in an increase in bonding between the polyolefin and the polymerised monomer which, as previously discussed, has various benefits in relation to improved strength and other physical characteristics. Thus, for example, where maleic anhydride has been grafted into the polyolefin chain, this can then be reacted with t-butylhydroperoxide in conventional manner by a thermal addition reaction at around 120° C. so as to form a corresponding perester which can generate free radicals at elevated temperature.

In this case there is a further practical benefit in that whereas t-butylperoxide, which can itself be used as a free radical generator, has a one hour half-life at around 199° C., the corresponding perester has a significantly lower one hour half-life temperature of around 119° C. thereby allowing polymerisation to be carried out at a lower temperature.

Another advantage of using such a two-stage initiator system is that the half life is considerably longer than for t-butylhydroperoxide alone so that the polyolefin-monomer mixture is more resistant to premature initiation and polymerisation and thus has a longer "pot-life" allowing longer handling times e.g. in spread coating or rotational moulding, without spontaneous polymerisation.

To prevent premature polymerization of the plasticiser monomer it may be useful to add additional inhibitors to the system. Most commercial monomers are provided with inhibitors to prevent polymerization during handling and processing. The level of such inhibitors should be increased to compensate for the time spent under the polyolefin polymer product forming conditions, i.e. the conditions used to form the base polyolefin polymer into a sheet or some other shape or configuration. In this connection the temperature is usually the most significant factor, but other conditions may also be relevant. Thus for example stearyl methacrylate is commercially provided with 275 parts per million (ppm) of the monomethyl ether of hydroquinone (MEHQ). Depending on the times and temperature involved 1000 ppm MEHQ, or more, may be needed. Inhibitors from a wide range of chemical families made be used for this purpose.

If desired the initiator may only be introduced into the mixture of the polyolefin and plasticiser monomer, after the product shape forming phase though this is generally less convenient. It will however be appreciated that in such cases this may allow greater flexibility in the choice of the product shape forming conditions.

The polymerisation of the plasticiser monomer can generally be carried out under any conditions suitable for the polymerisable monomer system used. In the case of a thermally activated system this will be at a sufficiently high temperature for the generation of an adequate supply of free radicals: generally when the initiator has a half life of 15 minutes or less at the polymerisation temperature. Thus for example when using a peroxide or azide initiator a suitable polymerisation temperature could be of the order of 180° C., and the temperature of the product shape forming will generally have been restricted to not more than 130 to 140° C. In the case of a radiation activated initiator (e.g. using UV, gamma, or electron beam radiation), temperature will generally be a less significant factor and higher product shape forming temperatures may then be used subject possibly to restrictions due to the sensitivity of the polyolefin and plasticiser monomer themselves to such higher temperatures, and/or the risk of residual activator from the original polyolefin production being undesirably activated.

The polymerisation will generally be carried out at ambient pressures, but higher pressures may be used if desired e.g. in order to prevent volatilization of volatile components in the polyolefin-plasticiser monomer system mixture.

The polymer system and the monomer system can be combined in a variety of ways to give a low viscosity (at least at elevated temperature) plasticised material that can be used to manufacture many types of products using several different fabrication techniques. The combination of the solid and liquid components can be done in any suitable manner e.g. by using a continuous or batch mixer, various types of continuous and batch blending devices, and various types of extruders. In all these types of equipment the solid components are mixed together at sufficient temperature and with sufficient shear to achieve both distributive and dispersive mixing. The liquid is introduced at the needed temperature and shear to dissolve the principal polymeric components and to obtain good distributive mixing and dispersive mixing of the insoluble components with the resulting fluid. The fluid system is then held at a temperature that retains the required fluidity for the fabrication of the final product form. In general this will usually be in the range from 80 to 120° C.

The fabrication techniques that can be used for the fabrication of the final product form include: spread coating, molding, cast molding, strand coating, spray coating, cellular coating, and cellular molding. The types of products that can be prepared by spread coating include: upholstery material, automotive roofing, apparel fabrics, wall coverings, floor covering, carpet backing, paper coating, and roll coating. Rotational molding can be employed to make such items as storage tanks, luggage shells, syringe bulbs, and inflatable toys. Dip coating can be used to produce gloves, wire racks, tool handles, and electric parts. Strand coating can be used to cover wire for such uses as insect screens; spray coating can be used to provide protective coatings on appliances and furniture; cellular coating can provide foam systems for fabrics, carpet backing, and upholstery; and foam molding can be useful for making bumpers, padding, flotation devices, and insulation. It is also possible to employ the invention in relation to manufacturing techniques such as powder coating wherein solid pellets of the polymer-monomer mixture are ground down or the solid mixture otherwise comminuted into particulate form which may then be applied to an article to be coated in generally known manner e.g. by spraying the powder onto the hot article.

Furthermore said pellets (or powder) of polymer-monomer mixture can be used in other fabrication techniques such as injection moulding to produce high-performance plastics from polyolefins which could not previously be satisfactorily injection moulded.

Further preferred features and advantages of the invention will appear from the following detailed Example given by way of illustration.

EXAMPLE 1

Preparation of Multi-Layer Floor Covering Using Multiple Spreading

A floor covering material is prepared as a four layer structure by a multiple spreading application technique. At an initial station a glass fibre web is saturated with polymer having composition A at a temperature of approximately 100° C. At a separate station a back coating of composition B is applied to the bottom side of the polymer saturated glass web at approximately 100° C. At another separate station the foamable layer, composition C, is applied to the top side of the polymer saturated glass web at approximately 100° C. A decorative pattern is then printed upon the foamable layer using a continuous printing process that employs, in one of several inks, benzotriazole, to deactivate the accelerated foaming system thereby to produce a chemical debossing effect upon foaming. In a further separate coating step of the process a clear wear layer of composition D is applied to the foamable layer at approximately 100° C. The structure is then passed through a oven system to crosslink the layers at approximately 170° C. and then expand the foam layer to approximately 200° C. The final cured, decorated and embossed product constitutes the floor covering material.

| A. (Saturant Layer) | PHR |
|---|---|
| Exact 4038 MPO Resin | 100 |
| Calcium Carbonate | 66.7 |
| Stearyl Methacrylate (settable plasticizer) | 90 |
| Trimethylolpropane trimethacrylate (settable plasticizer) | 10 |
| Lupersol 230 (free radical polymerisation initiator from Atochem) | 5 |
| Irganox 1010 | 0.1 |
| DSTDP | 0.1 |
| Ultranox 626 | 0.05 |
| B. (Backcoat Layer) | |
| Exact 4038 | 100 |
| Calcium Carbonate | 300 |
| Stearyl Methacrylate | 90 |
| Trimethylolpropane trimethacrylate | 10 |
| Lupersol 230 | 5 |
| Irganox 1010 | 0.1 |
| DSTDP | 0.1 |
| Ultranox 626 | 0.05 |
| C. (Foamable Layer) | |
| Exact 5008 | 100 |
| Calcium Carbonate | 66.7 |
| Stearyl Methacrylate | 90 |
| Trimethylolpropane trimethacrylate | 10 |
| Lupersol 230 | 5 |
| Celogen OT (chemical Blowing agent from Uniroyal) | 4 |
| Zinc Oxide | 2 |
| Luchem HA -B18 | 0.15 |
| Irganox 1010 | 0.1 |
| DSTDP | 0.1 |
| Ultranox 626 | 0.05 |
| D. (Wear Layer) | |
| Exact 3017 | 100 |
| Stearyl Methacrylate | 70 |
| Trimethylolpropane trimethacrylate | 30 |
| Lupersol 230 | 5 |
| Vinyl trimethosilane | 4 |
| Luchem HA -B18 | 0.3 |
| Irganox 1010 | 0.1 |
| DSTDP | 0.1 |
| Ultranox 626 | 0.05 |

What is claimed is:

1. A process for the manufacture of a plastics product from a polyolefin resin, said process comprising the steps of:
   (a) providing a polymerizable plasticizer monomer system which system comprises: a plasticizer monomer composition and a polymerization initiator, said composition containing: an effective plasticizing amount of plasticizer monomer relative to said polyolefin resin so as to act as a plasticizer or processing aid under the product shape forming conditions of step (c) used in the product manufacturing process as defined herein below, for polymerization of said monomer, said composition being substantially non-polymerizable under the product shape forming conditions, while being substantially polymerizable subsequently in said system so as to produce a product substantially free of liquid plasticizer, and said plasticizer monomer being a solvent for said polyolefin resin under said product shape forming conditions of step (c);
   (b) bringing said plasticizer monomer composition into intimate admixture with said polyolefin resin to produce a polyolefin-plasticizer mixture in which said polyolefin resin is dissolved in said plasticizer monomer;
   (c) forming said mixture into a desired product shape; and
   (d) subsequently inducing polymerization of said plasticizer monomer using the polymerization initiator so as to polymerize substantially said plasticizer monomer thereby to provide a final plastics product having said desired product shape substantially free of liquid plasticizer.

2. A process according to claim 1 which includes the step of including an additive in the polyolefin resin and plasticiser monomer composition.

3. A process according to claim 2 which includes the further step of including an inorganic filler additive.

4. A process according to claim 1 wherein is used a plasticizer monomer chosen from the group consisting of: (i) plasticizer monomers which are liquid under ambient conditions; (ii) plasticizer monomers which are liquid when in admixture with said polyolefin resin under said product shape forming conditions, and (iii) plasticizer monomers which are substantially solid at ambient temperature but enabling formation of a substantially homogenous and flowable mixture of polyolefin resin and plasticizer monomer at elevated temperatures below the polymerization temperature and in particular under the product shape forming conditions.

5. A process according to claim 1 wherein is used a polyolefin resin comprising two or more different polyolefins.

6. A process according to claim 1 wherein said polyolefin resin is produced by single-site catalysed polymerisation.

7. A process according to claim 1 wherein is used at least 20% of the plasticiser monomer in the polyolefin-plasticiser monomer mixture.

8. A process according to claim 7 wherein is used from 30 to 70% of the plasticiser monomer in the polyolefin-plasticiser monomer mixture.

9. A process according to claim 1 wherein said plasticiser monomer composition includes at least two different plasticiser monomers.

10. A process according to claim 1 wherein said plasticiser monomer has a polymerisable group capable of free radical polymerisation attached to a long-chain polyalkene.

11. A process according to claim 1 wherein said plasticiser monomer has a molecular weight of from 200 to 5000.

12. A process according to claim 10 wherein said long-chain polyalkene is a linear, branched or cyclic hydrocarbon having at least 10 carbon atoms.

13. A process according to claim 10 wherein said polymerisable group comprises at least one unsaturated bond.

14. A process according to claim 10 wherein said plasticiser monomer has at least two polymerisable groups.

15. A process according to claim 1 wherein said plasticiser monomer which is polymerisable into a solvent extractable polymer.

16. A process according to claim 1 wherein said plasticiser monomer has a non-polymerisable functional group for imparting fire retardant properties to said plastics product.

17. A process according to claim 1 wherein said plasticiser monomer has a flash point of at least 125° C.

18. A process according to claim 1 including the further step of selecting said polymerizable plasticizer monomer system such that it produces in said polymerized monomer a domain size of less that 200 nm in said plastics product.

19. A process according to claim 1 including the further step of selecting said polymerizabe plasticizer monomer system such that it produces in said polymerized monomer a compatibility and interfacial adhesion vis-a-vis the polyolefin such that said polymerized monomer has substantially spherical polymerized monomer domains in said plastics product.

20. A process according to claim 1 wherein said plasticiser monomer is selected to provide a polymerized monomer having a desired Tg value in the range from −80° C. to +160° C.

21. A process according to claim 1 wherein said polymerisable plasticiser monomer system includes a limited level of a polymerisation initiator compound relative to the plasticiser monomer so as to produce therefrom, upon polymerisation of said plasticiser monomer composition, a high molecular weight polymer having a molecular weight such that said polymer is substantially non-liquid under ambient conditions.

22. A process according to claim 21 wherein said initiator compound generates free radicals at temperatures substantially above these of the product shape forming conditions.

23. A process according to claim 22 wherein said initiator compound is selected from the group consisting of a peroxide compound, a peroxy compound, and an azo compound.

24. A process according to claim 21 wherein said polymerisation initiator compound is a photo-activatable initiator compound.

25. A process according to claim 21 wherein said polymerisation initiator compound is an inhibitor moiety which has been grafted on to polyolefin.

26. A process according to claim 21 wherein said plasticiser monomer composition further includes an inhibitor.

27. A process according to claim 1 wherein the step of forming said mixture is selected from the group consisting of a coating process, a moulding process, and a calendering process.

28. A process according to claim 27 wherein said forming step is a coating process selected from the group consisting of spread coating, spray coating, cellular coating, and strand coating, and dip coating.

29. A process according to claim 28 wherein said coating process is carried out at from 60 to 140° C.

30. A process according to claim 1 wherein polymerisation of said plasticiser monomer is carried out at a temperature of at least 40° C. above the temperature of the forming step.

31. A process according to claim 1 wherein the amount of initiator compound relative to the amount of plasticiser monomer in said plasticiser monomer composition is approximately 1:20.

32. A process for the manufacture of a plastics product with substantial tensile strength and/or impact resistance suitable for use in a floor-covering and comprising the process steps according to claim 1.

33. A plastics product when produced by a process according to claim 1.

34. A process according to claim 1 wherein at least one of said polyolefin resin and said plasticizer monomer is cross-linked whereby, upon polymerization of said plasticizer monomer, there is formed an at least semi-interpenetrating network of said polyolefin resin and the polymerized plasticizer monomer.

35. A process according to claim 9 whereby said plasticizer monomer composition contains from 2 to 20% of polyfunctional monomer.

* * * * *